Feb. 10, 1970  K. FISCHER  3,495,072
ELECTRIC HEATING ELEMENTS
Filed Dec. 21, 1967  2 Sheets-Sheet 2
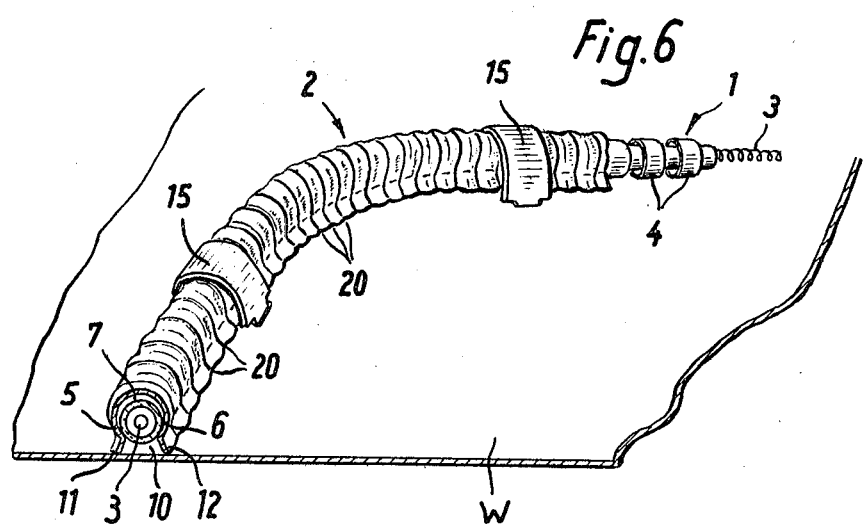
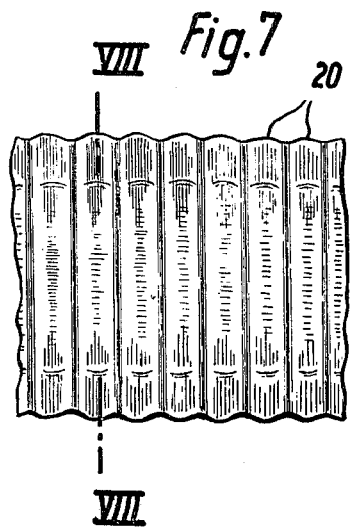
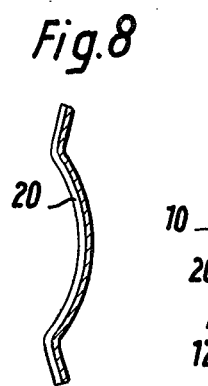
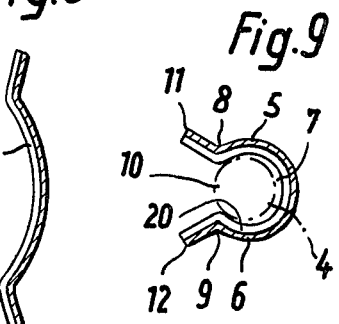
INVENTOR
Karl Fischer
BY Harness, Dickey & Pierce
ATTORNEYS United States Patent Office 3,495,072
Patented Feb. 10, 1970

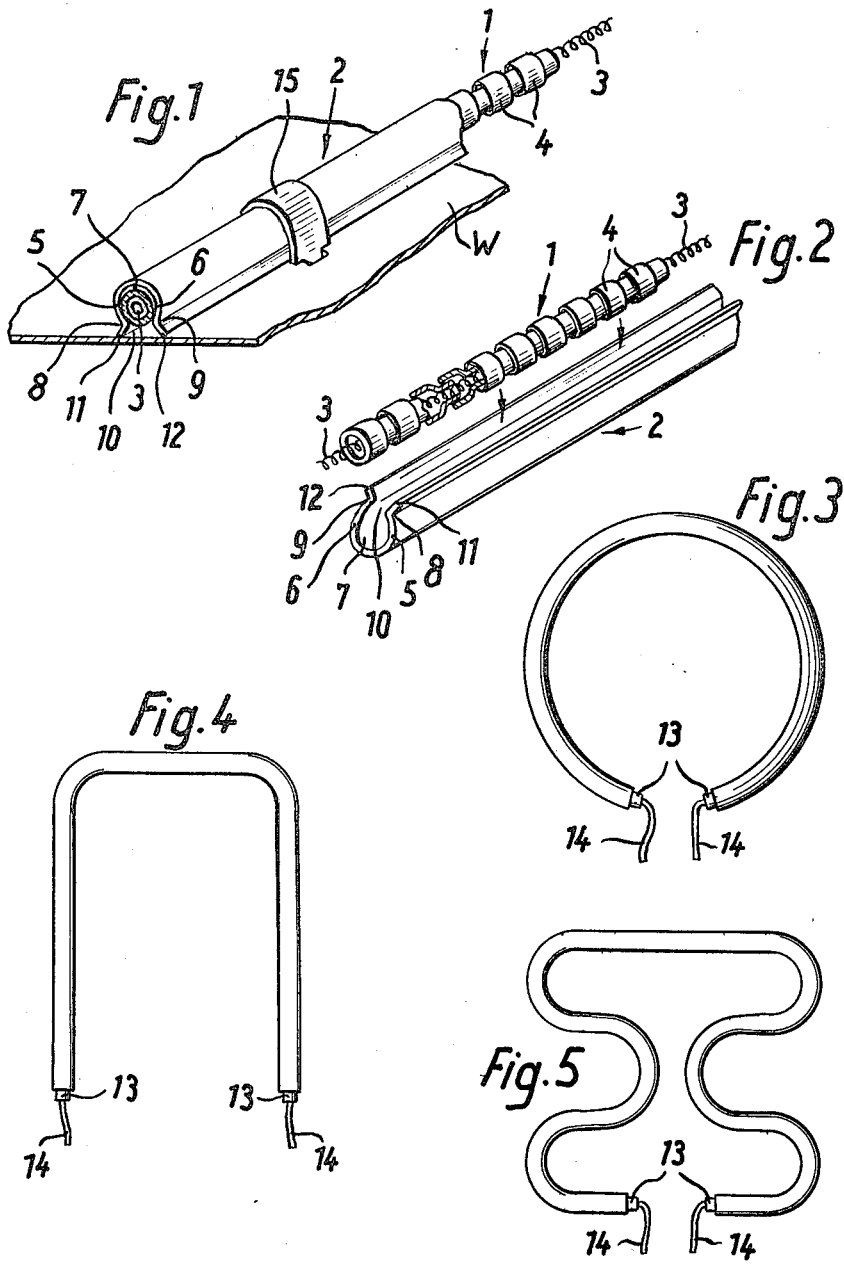

3,495,072
ELECTRIC HEATING ELEMENTS
Karl Fischer, Gaensberg, Oberderdingen, Wurttemberg, Germany
Filed Dec. 21, 1967, Ser. No. 692,517
Claims priority, application Germany, Dec. 13, 1966,
F 51,054; May 13, 1967, F 52,400
Int. Cl. H05t 3/02, 3/06; H01c 3/00
U.S. Cl. 219—550                    10 Claims

ABSTRACT OF THE DISCLOSURE

An electric heating element comprising an elongated casing, said casing having a generally U-shaped cross section, and opposed arms, said arms having longitudinally extending inwardly directed indentations formed therein to define a longitudinally extending restricted opening to the casing. A length of heating wire, a plurality of beads around said wire and in juxtaposition to one another, said beads having a maximum outside diameter greater than the width of the restricted opening defined by the opposed arms of the elongated casing and said beads thereon being disposed within said casing.

The present invention relates to an electric heating element for securing to a wall of an object, for example a baking oven muffle.

Heating elements of the kind in which a supporting casing in the form of a trough of U-shaped cross section the arms of which are bent inwardly over a beaded heating coil inserted therein are known.

One advantage of the present invention is that it simplifies the insertion of the beaded coil into the supporting casing and ensures that it cannot fall out.

According to the present invention an electric heating element comprises an elongated casing, said casing having a generally U-shaped cross section, and opposed arms, said arms having longitudinally extending inwardly directed indentations formed therein to define a longitudinally extending restricted opening to the casing, a length of heating wire, a plurality of beads around said wire and in juxtaposition to one another, said beads having a maximum outside diameter greater than the width of the restricted opening defined by said arms said heating wire and said beads thereon being disposed within said casing.

The beaded coil is now merely pressed into the casing and is then located securely and firmly therein. Thus, the subsequent complicated deforming of the support strip is eliminated, an operation attended by the danger of crushing the insulating beads. The shape of the support strip is immaterial, and it may be straight or bent along its entire length, or form a frame having alternate straight and bent portions.

Preferably, the ends of the arms on the support strip are directed obliquely outwards. This enables the heating element to be supported on a wider base on the object to be heated. Further, the two ends of the arms form a guide when the bead coil is pressed into the support strip.

Preferably, the ends of the arms are dimensioned so that they retain the heating coil in spaced relationship to the object to be heated. This ensures that the wall of the object is not excessively heated in the immediate vicinity of the heating coil, and prevents damage to an enamelled or other coating of the wall of the object by thermal stresses.

The bending of the casing is done by inserting a beaded chain into the casing at the bending points to reinforce them. This chain is subsequently removed.

The bending of the casing may be facilitated by providing it with transversely extending corrugations. The corrugations may be produced without additional expense during the necessary preforming of the sheet metal strip by rolling or pressing. The corrugation on the finished, trough-shaped casing facilitates the bending operation in that it renders the arms flexible relative to the tensile and compressive stresses occurring during bending.

One advantage of the corrugations is that the insulating beads are held within the casing in a more secure manner, since the profile is more resistant to bending in the transverse direction, so that there is greater security against the beads falling out at high temperatures.

The invention will now be further described by way of example with reference to the accompanying drawings, in which:

FIG. 1 illustrates diagrammatically a straight piece of a heating element constructed in accordance with the invention, FIG. 2 illustrates an exploded perspective view of a section of casing and beaded coil, according to the invention, FIGS. 3 to 5 inclusive illustrate some possible configurations of the heating element, FIG. 6 illustrates a piece of a heating element according to a preferred embodiment of the invention, FIG. 7 is a plan view of a section of the casing of FIG. 6 drawn to a larger scale, FIG. 8 is a cross section taken on the line VIII—VIII of FIG. 7, and FIG. 9 is a cross sectional view of the heating element of FIG. 6.

In the drawings, a beaded coil is designated 1 and a supporting casing is designated 2. The bead coil 1 comprises a heating coil 3 having ceramic beads 4 threaded thereon which inter-engage or nest axially as may be seen from FIG. 2. The support strip 2 is a generally U-shaped, sheet metal trough the arms 5 and 6 of which have an inside spacing somewhat greater than the diameter of the beads 4, thus forming a receiving channel 7 for the bead coil. Indentations or corrugations 8, 9 directed towards each other are pressed into the arms 5 and 6 of the support strip 2 in the vicinity of the outer ends thereof to define a longitudinally continuous slotted opening 10 the inside width of which is less than the diameter of the insulating beads 4. The outer ends 11 and 12 of the U-arms 5 and 6 contiguous to the indentations 8 and 9 are directed obliquely outwardly in the present embodiment.

The beaded coil 1 is pressed through the slotted opening 10 into the casing 2 in the direction of the arrows in FIG. 2. The beaded coil 1 forces apart the arms 5 and 6 between the indentations 8 and 9 and is received into the receiving channel 7 by virtue of the arms springing back. The beaded coil 1 is now held loosely in the receiving channel 7 and secured against falling out.

The connection ends 14 of the heating coil 3 are led out through specially shaped beads 13 provided at the ends of the bead coil 1. The casing 2 may be of any desired shape, for example it may be straight throughout its entire length or, as illustrated in FIG. 3, bent into a circular shape. Alternatively it may have alternate straight and bent portions as illustrated in FIGS. 4 and 5. It may be seen that the smallest radius by which the support strip 2 can be bent is determined by the bending property of the bead coil 1.

In the manner illustrated in FIG. 1, the finished heating element is mounted with the edges of the arm ends 11 and 12 of the support strip 2 abutting against a wall W of the object to be heated, the outside of the cover or of the bottom of a baking oven muffle of an electric hearth for example, and secured thereto by clamps 15.

Preferably, the ends 11 and 12 of the arms are dimensioned so that the bead coil 1 is at a distance from the wall W of the object to be heated (FIG. 1). Thus, the thermal radiation of the beaded coil 1 is distributed substantially uniformly over the broad base between the arm ends 11 and 12 forming stand feet, and the formation of any undesired intense local heating of the wall W is prevented.

The casing illustrated in FIGS. 6 to 9 differs from the one illustrated in FIGS. 1 and 2 only in that it has a transversely extending corrugations 20 which are formed in the sheet metal strips during the preforming of the original sheet metal strip as illustrated in FIGS. 7 and 8. The finished shape of the trough-shaped support strip illustrated in cross section in FIG. 9 and having the already preformed lateral indentations 8 and 9 and the outwardly directed ends 11 and 12 of the arms 5 and 6 forming the narrowed slotted opening 10 in front of the receiving channel 7 for the bead coil 1 is obtained by a simple bending operation.

The finished heating element is secured by clamps 15 to a wall W of an object to be heated, as hereinbefore described.

I claim:

1. An electrical heating element adapted to be affixed to a surface to be heated, said heating element comprising an elongated casing having a generally U-shaped cross section defining a longitudinally extending cavity, said casing defining a longitudinally extending restricted opening on one side of said cavity, said restricted opening having a transverse width less than the width of said cavity, a pair of diverging arms extending from a restricted opening in a direction away from said cavity and adapted to engage the surface to be heated, the points of engagement of said arms with the surface to be heated being spaced apart a greater distance than the width of said restricted opening, a length of heating wire, a plurality of ceramic beads encircling said wire and in juxtaposition to one another, said ceramic beads having a maximum outside diameter greater than the width of said restricted opening and being received in said cavity for containing said heating wire within said cavity in heat exchanging relationship to the surface to be heated, said casing being sufficiently resilient for insertion of said ceramic beads and the contained heating wire into said cavity through said restricted opening by deformation of said casing.

2. A heating element according to claim 1 wherein said heating wire is in the form of a spiral.

3. A heating element according to claim 1 wherein each of said beads are recessed to nestingly accommodate an adjacent bead.

4. A heating element according to claim 1 wherein said heating wire is in the form of a spiral and each of said beads are recessed to nestingly accommodate an adjacent bead.

5. A heating element according to claim 1 wherein the restricted opening is formed by indentations, said indentations being intermittently spaced along the length of said casing.

6. A heating element according to claim 1 wherein the restricted opening is formed by indentations, said indentations being intermittently spaced along the length of said casing.

7. A heating element according to claim 6 wherein transverse corrugations are provided in said casing which corrugations are spaced at intervals along the length of said casing.

8. A heating element according to claim 7 wherein said transverse corrugations in said casing are in between adjacent longitudinal ones.

9. A heating element according to claim 1 wherein the portions of the outer surfaces of the beads nearest to the ends of the arms of the casing are spaced inwardly from a plane containing the outer ends of the arms of the casing.

10. A heating element according to claim 1 wherein the casing is flexible about its longitudinal axis for deformation into a desired shape.

References Cited

UNITED STATES PATENTS

| 1,460,815 | 7/1923 | Hynes | 219—536 |
| 1,927,035 | 9/1933 | Hicks | 338—214 X |
| 2,019,780 | 11/1935 | Gough | 219—536 |
| 2,173,539 | 9/1939 | Peters et al. | 123—148 |
| 2,419,655 | 4/1947 | Reiser | 338—214 |
| 2,541,406 | 2/1951 | Clapp | 174—45 |
| 3,102,940 | 9/1963 | Stone | 219—537 |

FOREIGN PATENTS 190,515  4/1937  Switzerland.

VOLODYMYR Y. MAYEWSKY, Primary Examiner

U.S. Cl. X.R.

174—111; 219—536; 338—214

PO-1050
(5/69)

UNITED STATES PATENT OFFICE
CERTIFICATE OF CORRECTION

Patent No. 3,495,072          Dated February 10, 1970

Inventor(s) Karl Fischer

It is certified that error appears in the above-identified patent and that said Letters Patent are hereby corrected as shown below:

The German application specified in the priority claim was filed December 23, 1966, not December 13, 1966 as noted.

SIGNED AND SEALED
AUG 25 1970

(SEAL)
Attest:

Edward M. Fletcher, Jr.
Attesting Officer

WILLIAM E. SCHUYLER, JR.
Commissioner of Patents